United States Patent Office 3,407,151
Patented Oct. 22, 1968

3,407,151
PRODUCTION OF EXPANDABLE AND
CELLULAR RESIN PRODUCTS
Robert H. Overcashier, Walnut Creek, and Arthur L. Fricke, San Lorenzo, Calif., assignors to Shell Oil Company, New York, N.Y., a corporation of Delaware
Filed June 18, 1964, Ser. No. 376,200
10 Claims. (Cl. 260—2.5)

This invention relates to an improvement in production of expandable and cellular thermoplastic materials and particularly crystalline polypropylene.

In a copending commonly assigned application, Ser. No. 289,114, filed June 19, 1963, now Patent No. 3,310,617, there is described a method for the production of foamed thermoplastic materials which, while having wide applicability, is particularly advantageous for production of foamed crystalline polypropylene. The method of said parent application provides improvements in the dispersion of liquid volatile blowing agent in the polymer melt, and an improved process for the production of foamed thermoplastic material for such melts, as well as describing apparatus suitable for the practice of the process. The method is described specifically as it applies to the use of blowing agents which are at least partly compatible and miscible with the polymer and have a high rate of diffusion in melted polymer.

The art of producing foamed thermoplastic materials by direct extrusion of a mixture of volatile gaseous blowing agent and liquified thermoplastic material has heretofore been practiced and developed largely for the production of foamed polystyrene and related polymers. These materials have found wide commercial application. Volatile hydrocarbons such as butane, pentane or isopentane were found to be the preferred blowing agents in a production of foamed polystyrene. Not only have methods been developed for the production of foamed polystyrene by direct extrusion of a mixture of volatile hydrocarbon blowing agents and melted polymer from the extruder through suitable dies, but other methods have been developed for the production of foamed articles from so-called expandable polystyrene particles. Expandable polystyrene can be produced by several methods. Conventional nibs or beads may be steeped in liquid hydrocarbon blowing agent such as pentane. They swell as they absorb the liquid hydrocarbon. The monomer may be polymerized in a liquified volatile hydrocarbon medium such as pentane. A homogeneous mass of polymer and volatile hydrocarbon blowing agent may be extruded and promptly chilled before expansion has taken place. The expandable material may be extruded in strands and chopped, or it may be extruded in larger bodies such as sheets. In expandable polystyrene, the compatible blowing agent is present in diffused form, homogeneously distributed throughout the polymer particles. The expandable masses may be transported to the place where they are to be utilized and then expanded to their foamed state in molds or otherwise, as desired. This is a highly desirable and practical method of producing foamed thermoplastic articles in a location different from that where the expandable material is manufactured.

It has been found that polypropylene is not readily adaptable to the same extrusion techniques of expansion and of production of expandable material as is polystyrene. Crystalline polypropylene has different physical characteristics which cause difficulties in the production of expanded shapes by extrusion of a blend of a polymer and blowing agent, and which cause the rapid loss of volatile hydrocarbon blowing agent from an extrudate, so that the production of expandable particles containing hydrocarbon blowing agents such as pentane is not practically possible.

It has now been found that many of the disadvantages of employing a soluble volatile blowing agent with polypropylene in the production of expanded or expandable products are overcome by substituting for the polypropylene-soluble hydrocarbon a completely incompatible or insoluble volatile liquid. An essential feature of the invention is the production of a substantially uniform dispersion of fine, discrete masses of blowing agent in a matrix of melted polymer, and extrusion and cooling of this dispersion without substantial congulation of said fine masses.

While this invention is particularly advantageous when applied in the production of expanded cellular and of expandable articles from polypropylene, it can also be practiced with other thermoplastic polymers.

In one preferred embodiment this invention comprises mixing solid, finely divided particles of crystalline polypropylene with immiscible liquid blowing agent such as water under such conditions that a fine film thereof is formed around the particles, applying pressure and increasing the temperature so as to melt the polymer particles while maintaining said blowing agent in intimate contact with the melted material and in the form of liquid or of a fluid having a density in excess of 1 pound per cubic foot, cooling the melt, if necessary, to a temperature above the crystallization point of the polypropylene to further increase its viscosity while maintaining said pressure and then extruding the melt either under conditions of pressure and temperature at which blowing agent contained in the melt is vaporized so as to produce a foamed product or under conditions of temperature and pressure such that the melt is cooled while retaining droplets of blowing agent in liquid phase in the polymer mass so as to produce an expandable polypropylene particle.

In a second preferred embodiment, powdered polymer resin is admixed with a suitable, finely divided solid adsorbent, which serves to adsorb the required amount of immiscible liquid blowing agent, such as water. The adsorbent may be treated to adsorb the blowing agent before being mixed with powdered resin, or the mixture of resin and adsorbent may be exposed to blowing agent in a manner similar to that described above. Melting of the mixture, extrusion and cooling then take place as in the first-described embodiment.

It should be noted that each of these embodiments can be employed both in the production of expanded shapes in which expansion takes place immediately upon extrusion, and in the production of expandable shapes in which the blowing agent remains distributed in discrete, very fine and evenly distributed liquid masses throughout the solidified resin extrudate.

Still other methods of preparing a dispersion of finely divided droplets of insoluble blowing agent in liquid polypropylene may be devised and used in accordance with this invention.

In other modes of practicing this invention different polymers may be substituted for the polypropylene and different volatile blowing agents may be substituted for the water, as described in further detail below.

It may be advantageous, or at times necessary, to include a surfactant in the expandable mass to assist in providing and maintaining the desired uniform distribution of finely divided fluid particles in the polymer mass. Surfactants may be selected from those known to provide detergent or emulsifying activity. Such materials are well known and commercially available.

Figure 1:
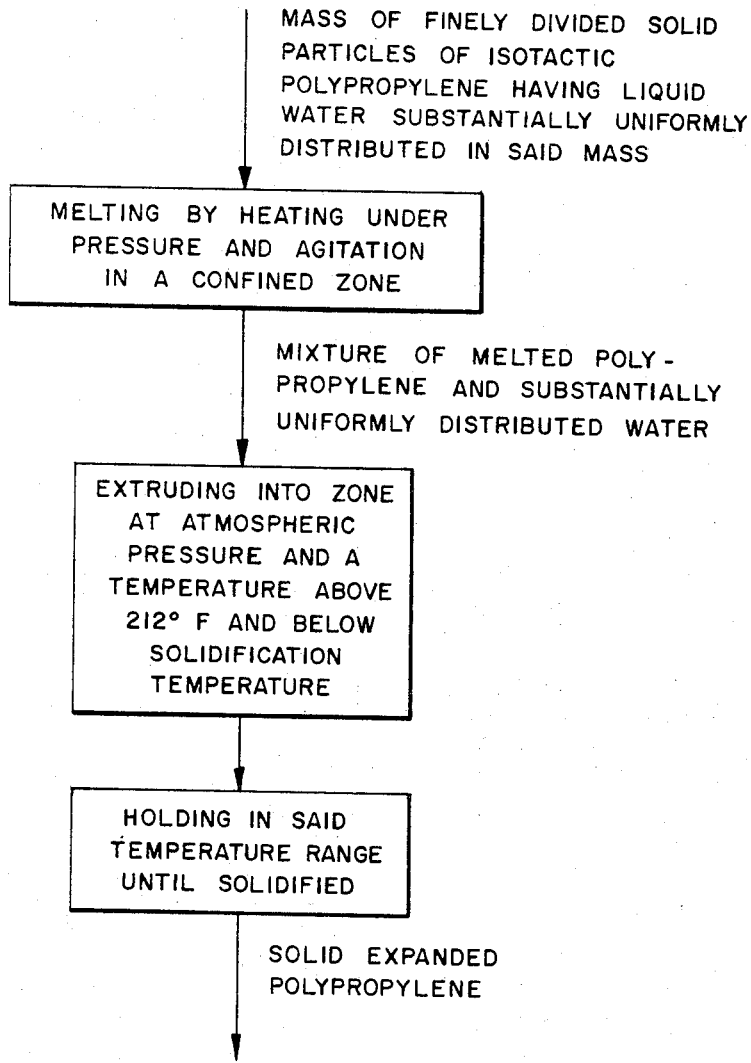
FIGURE 1 illustrates a method of producing expanded polypropylene.
Figure 2:
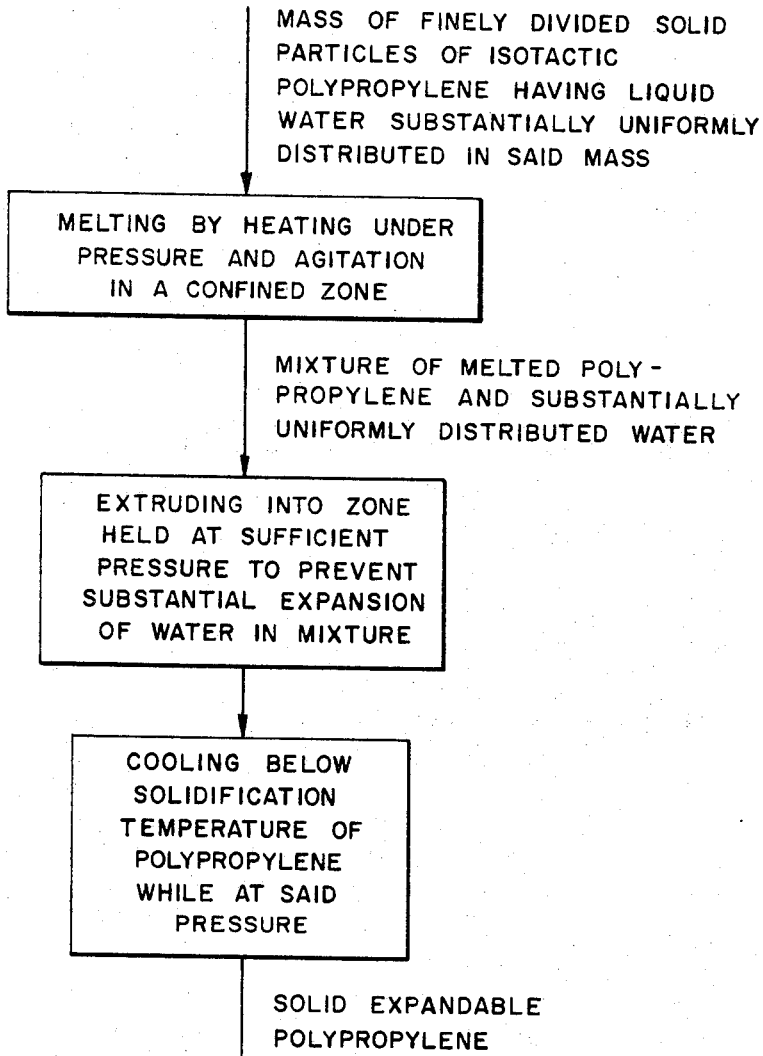
FIGURE 2 illustrates a method of producing expandable polypropylene.

The preferred polymers for use in this invention are resins consisting predominantly of crystallizable steroregular and particularly of isotactic polypropylene. Following conventional terminology, reference to "crystallizable" or "stereoregular" polypropylene means, unless the context indicates otherwise, solid polypopylene having a high degree of stereoregularity reflected in at least 50% crystallinity, usually between 60 and 70% (as determined by X-ray diffraction analysis, infrared analysis or comparable methods), when solidified under conditions which favor crystallization. In general this type of polypropylene contains at most only a very small proportion which is extractable in paraffinic hydrocarbons up to gasoline boiling range. Typically, the proportion of highly crystallizable polypropylene which is extractable in boiling heptane or octane is less than 10% and usually less than 5%. The viscosity average molecular weight of such stereoregular polypropylene is usually at least about 40,000 and generally between 100,000 and 1,600,000. The intrinsic viscosity, measured in Decalin at 150° C., expressed in dl/g. may be as low as 0.8 or less and as high as 12 or more. Crystallizable polypropylene employed in the production of foamed articles according to this invention suitably has an intrinsic viscosity between 1 and 12 and preferably between 1.5 and 7.

The crystal melting temperature ($T_m$) of highly isotactic polypropylene is 167° C. At temperatures below 167° C., polypropylene crystals can form. The rate at which they form and the rate at which the polymer solidifies is a function of the cooling conditions. It is known that isotactic polypropylene does not achieve its normal crystalline state until it has been cooled below a recrystallization temperature ($T_c$) which generally lies between 120° and 145° C. and is a function of the rate of cooling.

Foamed articles can also be prepared according to this invention from crystalline linear polymers of other alpha-mono-olefins particularly of those having from 2 to 8 carbon atoms, such as ethylene, 1-butene, 3-methyl-1-butene, 4-methyl-1-pentene, 4-methyl-1-hexene and the like, which are known to produce crystalline polymers. All of these polymers are produced by so-called low pressure polymerization methods. Reactant, catalysts and conditions useful in the production of such polyolefins are known. The state of the art in this field in 1959 was reviewed for example in "Linear and Stereoregular Addition Polymers" by Gaylord and Mark, Interscience Publishing, New York, 1959. Polyethylene and polypropylene resins are now staple materials of commerce and polymers of other olefins can be similarly prepared.

Non-rubbery copolymers of the above mentioned olefins, such as block copolymers, are also suitable for use in this invention.

While this invention is of particular advantage with the above-described polymers, it may also be employed in the production of expanded articles from other thermoplastic materials which are obtainable as solid particles. This group includes, in addition to the above-described polyolefins, certain polycarbonates, cellulose derivatives, nylons, polymers of styrene, alpha-methylstyrene, and other vinyl-aromatics, and their copolymers such as so-called ABS (a terpolymer of styrene, acrylonitrile and butadiene) and SAN (a copolymer of styrene and acrylonitrile); acrylates, such as polymers of acrylic or methacrylic acid, such as methyl methacrylate, ethyl acrylate, butyl acrylate; polyvinyl chloride and its modifications such as with polyvinyl acetate; polyvinylidene chloride; and a variety of other polymers, such as those of vinyl acetate, vinyl butyrate, vinyl bromide, acrylonitrile, methacrylonitrile, vinyl benzoate, allyl chloride, allyl acetate, allyl benzoate, vinyl laurate, vinyl stearate, vinyl methyl succinate, allyl butyl phthalate, divinyl succinate, diallyl phthalate, crotyl amyl phthalate, diallyl isophthalate, diallyl terephthalate, ethylene glycol diacrylate, viny ethyl ether, vinyl butyl ether, vinyl butyl ketone, allyl amine, vinyl pyrrolidone, vinyl pyridene, acrylamide, N-ethyl acrylamide and the like and of mixtures of monomers of this group. Also suitable are blends or mixtures of such polymers with each other or with other materials such as wax.

The thermoplastic polymer is employed in the preferred mode of practicing this invention in the form of solid finely divided particles. The particles may be individual particles or agglomerates of two or more particles sticking together. The individual particles are preferably between 0.5 and 10 microns in diameter. The average size for particles which are agglomerates of two or more particles sticking together is generally below about 1,000 microns. Average size for the particles thus may vary from 0.5 microns to 1,000 microns.

In other modes of practicing this invention, other forms of polymer may be charged to the apparatus in which the blend of polymer and blowing agent is prepared. In such modes, the polymer may be charged directly as a melted liquid from a previous processing step or it may be charged in the form of conventional particles such as pellets or nibs, which are melted and mixed with the blowing agent.

The blowing agents used in the process of this invention are characterized by (1) being substantially or completely immiscible with the liquid polymer; (2) being in the liquid phase or in a high-density, supercritical state at a density in excess of one pound per cubic foot at the temperature prevailing in the resin melt at the pressure employed to contain the melt; and (3) volatilizing at the temperature and pressure selected for carrying out the expansion of the polymer mass. The volatile blowing agents which remain liquid in the polymer thus have a critical temperature which is higher than the melting point of the polymer. Those which are high density fluids but not liquids are at temperatures somewhat above their critical temperature. Since expansion usually takes place at atmospheric pressure, the atmospheric boiling point of the suitable blowing agents is preferably at least about 20° F. below the polymer melt temperature; it is suitably below 250° F.

A blowing agent which is immiscible with one resin is not necessarily immiscible with other resins. The selection of suitable blowing agents must therefore be made with each particular resin in mind. Determination of miscibility can be carried out by standard methods.

A suitable guide in the selection of blowing agents for a given resin is the "solubility parameter $\delta$," which is described in "The Solubility of Non-Electrolytes" by Hildebrand and Scott, Reinhold Publishing Corp., New York, 1949 (3d edition). The solubility parameter and its use has been extensively discussed by H. Burell in "Interchemical Review," 14, No. 1, pp. 3 and 31, (Spring 1955). For guidance in selecting an appropriate blowing agent, those are selected which have a solubility parameter that differs by at least three units from that of the melted polymer.

For polypropylene, which has a solubility parameter of about 8, suitable blowing agents are selected, for example, from the group consisting of water, acetone, ammonia (both pure and aqueous), methanol, ethanol, isopropanol, acetaldehyde, methyl formate and nitromethane.

For nylon and polyvinylidene chloride, which have solubility parameters of about 12 to 13, suitable blowing agents may be selected, for example, from the group consisting of propane, butane, pentane, hexane, ether and polychlorofluoromethanes and ethanes.

While it has been found when using compatible or partially compatible blowing agents that a foam-nucleating agent should be included in the expandable composition, such nucleating agents are not particularly advantageous in the production of foams according to the present invention; however, the practice of this invention is also compatible with the inclusion of foam-nucleating agents in the expandable melt.

As stated before, it may be desirable to include a solid adsorbent in admixture with the resin powder, to serve as carrier for the blowing agent prior to melting the polymers. Such solid adsorbents include, among others, silica gel, molecular sieves, alumina, activated charcoal, and the like. These solids are preferably finely divided; their particle sizes may be of narrow or broad size distribution. Preferred particle size varies from about the same size as the polymer particles down to several orders (e.g., 1–2) of magnitude smaller than the polymer particles.

Other materials may also be included with the polymer particles, such as for example finely divided pigments, finely divided particles of asphaltic materials, plasticizers, dyes and the like, depending upon the intended use of the finished product. The addition of surfactants has been described.

The addition of adsorbents and/or other materials to the polymer particles may be accomplished at any suitable point, such as during the manufacture of the polymer or by admixture prior to or during the preparation of the expandable melt.

The amount of the above-described components to be used in the process of the invention will vary over a wide range.

The blowing agent generally is employed in a concentration from about 0.1 to 60% by weight of the thermoplastic polymer material. Preferably the volatile immiscible liquid blowing agents are employed in amounts varying from about 0.2 to 30% by weight of the thermoplastic material. In general, the preferred ranges provide 0.001 to 0.003 pound mole of blowing agent per pound of polymer.

The amount of adsorbent may vary from about 0.01 to 5% by weight of the polymer and, if used, is usually in the range from 0.1 to 3% by weight of the thermoplastic material.

In the operation of one preferred mode of the process, finely divided particles of isotactic polypropylene are placed in a hopper which is capable of being evacuated or placed under superatmospheric pressure. After the polymer powder has been placed in the hopper the hopper is closed off and placed under vacuum. The walls of the hopper are warmed and a sufficient amount of steam is introduced while the particles are being stirred to provide the desired concentration of water. The steam condenses on the polymer particles. The hopper is agitated and this stirring may continue for an additional time as much as 30 minutes to 12 hours to allow the mixture to equilibrate, i.e., to obtain an even distribution of blowing agent on the polymer particles.

The second part of the said mode of the process is to form a melt of the above mixture while maintaining conditions such that the blowing agents remain in intimate contact with the thermoplastic materials. This is preferably accomplished by applying nitrogen pressure to the mixture and then forcing it by means of a crammer, e.g., a helical screw, into an extruder. The extruder may be a screw type extruder such as illustrated in said application Ser. No. 289,114, now Patent No. 3,310,617. As the mixture is advanced through the extruder the mixture is heated and the polymer is melted. The nitrogen pressure is sufficient to keep the blowing agent in contact with the particles during the melting, and should preferably be at least equal to the vapor pressure of blowing agent at the temperature of extrusion, for instance at 100 to 300 p.s.i. when the polymer is isotactic polypropylene and the blowing agent is water. The temperatures employed in the extruder are at least sufficient to melt and fuse the polymer, i.e., to soften it to a flowable condition. The exact temperature employed will vary with the individual polymer but in general will vary from about 275° F. to about 400° F. In the case of isotactic polypropylene it is generally preferred to employ a temperature of about 300° to 330° F. at the inlet end of the extruder and a temperature of about 345° to 365° F. at the outlet end of the extruder.

The melt obtained in the above described process has a surprisingly uniform composition in that the blowing agent remains incorporated in a substantially uniform distribution throughout the melt in the form of very fine droplets, i.e., having a diameter of about 0.02 to 1 mm. This form of the melt will herein be referred to as a "dispersion."

The above-described uniform melt dispersion can be used to form superior foamed products having desired cell size and cell size distribution. Important in obtaining a product of desired cell structure are the amount and type of blowing agent selected, the temperature of the melt, the rate of pressure release, and the cooling conditions.

In forming a cellular product by direct expansion of the above-described melt prepared by the process of the invention, formation of the foamed product is effected by forcing the melt, at a temperature above the crystallization point of the thermoplastic polymer and a pressure sufficient to prevent volatilization of the blowing agent, through the desired orifice into a zone maintained at a lower pressure and temperature.

The temperature employed at the entrance to the die orifice will vary depending on the nature of the thermoplastic polymer material as each has its own crystallization point. In general, the temperature of the melt will vary with amount and type of blowing agent. In the case of olefin polymers, such as polypropylene, the temperature should preferably be between 280° F. and 315° F. at the die immediately prior to foaming.

The pressure employed at this stage should be sufficient to effect a pressure drop across the die orifice of preferably at least 300 p.s.i., so as to prevent foaming upstream of the die. The exact pressure depends on amount and type of blowing agent, type of polymer and final temperature of the polymer. The pressure drop can be controlled by increasing the land length of die, by putting in restrictions, increasing the flow rate, decreasing the die area and the like.

The die or orifice employed must possess a specific geometry and size depending upon the nature of the product desired, e.g., such as bubble size and gross shape. The orifice may be, for example, a thin slit or annulus so as to form sheet material or as small round aperture to form tubular material, etc. A few routine runs will help demonstrate the best type and construction of die to be employed.

The equipment used in effecting the process of the invention may be of any desired design as long as it accomplishes the above-noted steps. A suitable assembly of apparatus comprises a combination of pressurized mixing hopper, pressurized single stage screw-type extruder with a sealed screw shaft, heat exchanger which is preferably internally finned, and a die. Such an assembly of apparatus is illustrated in more detail in said copending application Ser. No. 289,114, now Patent No. 3,310,617. The description is incorporated herein by reference.

In a typical formation of cellular products from polypropylene, powdered polypropylene having a particle size (agglomerates) of less than 600 microns is introduced into a mixing hopper. The mixture is there heated to 60–150° F. and the mixing hopper evacuated to as low a pressure as possible. Steam is then introduced into the hopper and the combined mixture stirred to effect thorough mixing of the blowing agent with the polymer particles during addition of the blowing agent. The vessel is then pressurized with nitrogen (e.g., 420–450 p.s.i.g.) and the extruder started, the temperature in the extruder varying over the distance of the extruder from 320° F. at the feed or rear end to 370° F. at the discharge or front end. The mixture of blowing agent and particles is then forced by a cramming screw into the extruder where it is formed into the desired melt. The pressure at the discharge end of the extruder (entrance to heat exchanger) is 1400 p.s.i.g. to 1600 p.s.i.g. In a heat exchanger, the melt solution is cooled from 350° F. to a temperature in the range 325° F. to 295° F. (which is just above the crystallization point of the polypropylene). From the heat exchanger the melt is then forced through die, where the pressure is released to atmospheric pressure and the desired cellular product is formed.

In the production of cellular articles by extrusion under polymer expanding conditions, the conditions in the zone into which the expandable mass is extruded may include a low pressure, such as atmospheric, and a temperature regime which provides for gradual cooling. For example, where water is the blowing agent, the mass may be extruded into the air- or inert-gas filled zone held at a temperature above 212° F. to prevent collapse of the foam cells due to water condensation. This allows air to diffuse into the cells as the polymer gradually solidifies.

In the production of expandable shapes, the conditions must be controlled such that the polymer is cooled below its recrystallization temperature to a temperature where the blowing agent vapor pressure is less than about 2 atmospheres before there has been any substantial expansion. This may be achieved by extruding the melt into a zone which is at a low temperature but relatively high pressure, e.g., as high as the pressure in the extruder.

In the expandable melts the blowing agent may be a fluid in supercritical state, provided it has a sufficient density to provide the desired degree of expansion, i.e., a density of at least one pound per cubic foot. In expandable solid polymer articles the blowing agent must be in the liquid phase.

The process of the invention may be conducted in a batchwise, semi-continuous or continuous manner. While the above-described assembly of apparatus is suited for semi-continuous operation, one can effect a continuous operation by use of a polymer powder pump for injecting the mixture of polymer particles into the pressurized hopper where the mixture is contacted and mixed with the blowing agent.

The cellular products prepared by the above process are closed-cell products and preferably have a density varying from 0.8 lb./cu. ft. to 30 lb./cu. ft., and cell size varying from $10\mu$ to ¼-inch. The products are ideally suited for use in making foamed insulation material, cushions, pillows, sponges, package equipment, synthetic paper, boats, floats and other materials of construction.

To illustrate the manner in which the invention may be carried out, the following examples are given. It is to be understood, however, that the examples are for the purpose of illustration and the invention is not to be regarded as limited to any of the specific materials or conditions recited therein. Unless otherwise indicated, parts are parts by weight.

EXAMPLE I

This example illustrates the operation of the process of the invention in making an improved cellular product from polypropylene, using water as the blowing agent.

(A) Crystalline polypropylene having an intrinsic viscosity of 2.5 dl/g. and agglomerate particle size of less than 600 microns was placed in a mixing hopper. Here the particles were stirred. The hopper was then evacuated to 29 inches of vacuum and steam (between 2 and 3% wt. of the polymer) was introduced into the hopper while stirring the polymer particles. The combined mixture was stirred for about 1 hour to effect an even distribution of the water on the polypropylene particles. The stirrer and crammer rotation was reversed so as to cram powder into the extruder and the mixture pressured with nitrogen at 445 p.s.i.g. The inlet of the extruder was at 320° F. and the outlet end was at 345–350° F. At this point, the nitrogen pressure maintained in the hopper kept the water from escaping from the extruder through the feed port and kept it in intimate contact with the polymer particles as they melted and formed the uniform melt. The melt is taken into the heat exchanger as shown in the drawing where it is cooled to about 310° F. Thence the melt went into the die and out the orifice which was a single circular hole 0.073-inch in diameter. The pressure drop across the die was 900 pounds. The resulting product was a cellular polypropylene product of rod shape.

The foaming strand of polymer was pulled through a long tube containing air heated to a temperature above the normal boiling point of water so as to allow air to diffuse into the cells to prevent collapse of the cells upon cooling of the polymer. Such collapse would occur when the temperature of the polymer drops below 212° F. under which conditions the water vapor in the cells would condense while the cell walls are still sufficiently soft to be readily deformable.

The foam produced had a density of about 3 lbs./cu. ft. and relatively large cell sizes in the range from 200 to 700 microns, some of the cells being open and some being closed.

Variation in the conditions of extrusion permit production of foams having other properties, such as closed cell foams of smaller cell size.

EXAMPLE II

The method of preparing a melt of polypropylene and water as described in Example I is repeated. The melt is extruded into a section of heated pipe under sufficient pressure to maintain the water in the form of liquid droplets dispersed in the melted polypropylene. A portion of the pipe containing this melt dispersion is closed off by valves at both ends and is then removed and cooled while under pressure. The resulting polypropylene rod, upon removal from the pipe, is found to contain some large holes or vacuoles, which are generally found in ordinary polypropylene cooled under similar circumstances in the absence of volatile liquid, and which contain no blowing agent. It further contains a large number of finely dispersed water droplets. It also contained cracks, such as are often formed in polypropylene cooled under similar conditions.

A portion of this water-containing solid polypropylene rod is bathed in an air stream at a temperature of approximately 200° to 250° C. This results in an expansion of the rod to form a cellular article.

EXAMPLE III

Example I is repeated with the exception that ethanol is used as the blowing agent. In this case, the resulting product is a uniform cellular product of similar properties.

EXAMPLE IV

Example I is repeated with the exception that the polypropylene is replaced by polyethylene particles and the temperatures and pressures adjusted accordingly. Related results are obtained.

We claim as our invention:

1. Expandable isotactic polypropylene consisting essentially of solid non-cellular isotactic polypropylene containing substantially uniformly distributed within the polypropylene mass as sole potential blowing agent finely divided discrete masses of a liquid which is substantially immiscible with said polypropylene, said liquid being selected from the group consisting of water, acetone, ammonia, methanol, ethanol, isopropanol, acetaldehyde, methylformate, and nitromethane.

2. Expandable polypropylene as defined in claim 1 in which said liquid is water.

3. Expandable polypropylene as defined in claim 1 in which said liquid is ammonia.

4. Expandable polypropylene as defined in claim 1 in which said liquid is methanol.

5. Expandable polypropylene as defined in claim 1 in which said liquid is ethanol.

6. Expandable polypropylene as defined in claim 1 in which said liquid is acetaldehyde.

7. A process for producing expanded polyolefin comprising the steps of (a) introducing into a screw extruder a mass of finely divided solid particles of crystalline linear polymer of alpha monoolefins of from 2 to 8 carbon atoms per molecule having liquid water evenly distributed in said mass, (b) applying sufficient heat to said mixture in said extruder to melt said polyolefin while maintaining sufficient pressure and agitation to keep said water distributed in the resulting melt in the form of substantially uniformly distributed, finely divided discrete masses of liquid water, (c) extruding the resulting mixture into a zone which is at atmospheric pressure and at a temperature above 212° F. and below the crystallization temperature of said polyolefin and (d) holding the extrudate in said temperature range until the polyolefin has solidified.

8. A process according to claim 7 wherein said polyolefin is isotactic polypropylene.

9. A process for producing non-cellular expandable polyolefin, comprising the steps of (a) introducing into a screw extruder a mass of finely divided solid particles of crystalline linear polymer of alpha monoolefins of from 2 to 8 carbon atoms per molecule having liquid water evenly distributed in said mass, (b) applying sufficient heat to said mixture in said extruder to melt said polyolefin while maintaining sufficient pressure and agitation to keep said water distributed in the resulting melt in the form of substantially uniformly distributed, finely divided discrete masses of liquid water, (c) extruding the resulting mixture into a zone which is at a sufficient pressure to prevent substantial vaporization of said water, and (d) cooling the extruded mixture in said zone to a temperature which is below the crystallization temperature of polypropylene and at which the vapor pressure of water is less than about two atmospheres.

10. A process according to claim 9 wherein said polyolefin is isotactic polypropylene.

References Cited

UNITED STATES PATENTS

| | | | |
|---|---|---|---|
| 2,299,593 | 10/1942 | Roberts et al. | 260—724 |
| 2,329,322 | 9/1943 | Baty et al. | 264—49 |
| 2,354,260 | 7/1944 | Haney et al. | 264—53 |
| 2,372,695 | 4/1945 | Taylor | 264—53 |
| 2,512,463 | 6/1950 | Maier | 264—53 |
| 2,518,454 | 8/1950 | Elliott. | |
| 2,528,200 | 10/1950 | Weinberg | 264—41 |
| 2,772,322 | 11/1956 | Witt et al. | 264—49 |
| 2,861,898 | 11/1958 | Platzer. | |
| 3,177,164 | 4/1965 | Mills et al. | 260—2.5 |
| 3,214,234 | 10/1965 | Bottomlay | 264—54 X |
| 3,026,272 | 3/1962 | Rubens et al. | 260—2.5 |

FOREIGN PATENTS

| | | |
|---|---|---|
| 773,125 | 4/1957 | Great Britain. |
| 836,080 | 6/1960 | Great Britain. |

JAMES A. SEIDLECK, *Primary Examiner.*

P. E. ANDERSON, *Assistant Examiner.*